US012646298B2

(12) United States Patent
Wang et al.

(10) Patent No.: US 12,646,298 B2
(45) Date of Patent: Jun. 2, 2026

(54) METHOD, ELECTRONIC DEVICE, AND COMPUTER PROGRAM PRODUCT FOR GENERATING IMAGE SAMPLES

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 390 days.

(21) Appl. No.: 18/225,725

(22) Filed: Jul. 25, 2023

(65) Prior Publication Data

US 2025/0037429 A1 Jan. 30, 2025

(51) Int. Cl.
| | |
|---|---|
| *G06V 10/774* | (2022.01) |
| *G06V 10/74* | (2022.01) |
| *G06V 10/764* | (2022.01) |
| *G06V 10/77* | (2022.01) |
| *G06V 20/70* | (2022.01) |
| *G06V 10/82* | (2022.01) |

(52) U.S. Cl.
CPC .......... *G06V 10/774* (2022.01); *G06V 10/761* (2022.01); *G06V 10/764* (2022.01); *G06V 10/7715* (2022.01); *G06V 20/70* (2022.01); *G06V 10/82* (2022.01)

(58) Field of Classification Search
CPC .. G06V 10/774; G06V 10/761; G06V 10/764; G06V 10/7715; G06V 20/70; G06V 10/82

USPC .......................................................... 382/157
See application file for complete search history.

(56) References Cited

U.S. PATENT DOCUMENTS

2021/0398259 A1* 12/2021 Yamazoe ............... G06N 3/091

OTHER PUBLICATIONS

Guangyi Zhang, Ali Etemad, Distilling EEG representations via capsules for affective computing, arXiv:2105.00104v1 [cs.LG] Apr. 30, 2021 (https://arxiv.org/abs/2105.00104) (Year: 2021).*

* cited by examiner

*Primary Examiner* — Charlotte M Baker
(74) *Attorney, Agent, or Firm* — Krishnendu Gupta; Lesley Leonessa

(57) ABSTRACT

Embodiments of the present disclosure provide a method, an electronic device, and a computer program product for generating image samples. The method includes processing a group of image samples using a class capsule network model, and obtaining a group of distilled samples, a feature distribution of the group of distilled samples indicating a feature distribution of the group of image samples; and determining a soft label of each distilled sample in the group of distilled samples on the basis of a label of the group of image samples, the soft label representing a probability that the distilled sample belongs to each of a plurality of classes. As such, class capsules in a trained capsule network model are extracted as distilled samples, and soft labels are assigned to the distilled samples on the basis of original image samples, so that the extracted distilled samples can be ensured to have high explainability.

20 Claims, 5 Drawing Sheets

Process a group of image samples using a class capsule network model, and obtain a group of distilled samples, a feature distribution of the group of distilled samples indicating a feature distribution of the group of image samples Determine a soft label of each distilled sample in the group of distilled samples on the basis of a label of the group of image samples, the soft label representing a probability that the distilled sample belongs to each of a plurality of classes

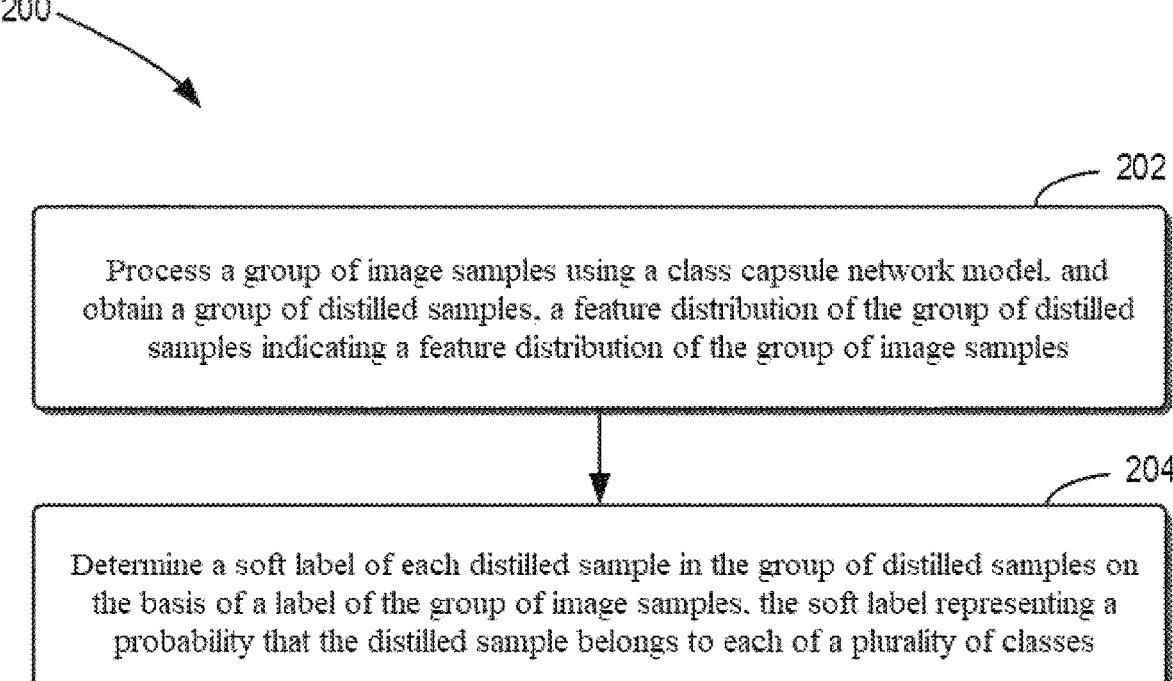

200

202

Process a group of image samples using a class capsule network model, and obtain a group of distilled samples, a feature distribution of the group of distilled samples indicating a feature distribution of the group of image samples

204

Determine a soft label of each distilled sample in the group of distilled samples on the basis of a label of the group of image samples, the soft label representing a probability that the distilled sample belongs to each of a plurality of classes

FIG. 2

METHOD, ELECTRONIC DEVICE, AND COMPUTER PROGRAM PRODUCT FOR GENERATING IMAGE SAMPLES

TECHNICAL FIELD

Embodiments of the present disclosure relate to the field of computers, and more particularly, to a method, an electronic device, and a computer program product for generating image samples.

BACKGROUND

Nowadays, users in the artificial intelligence industry, such as autonomous driving companies, rely on the computing power for a large amount of data. Managing data, machine learning models, and basic IT systems are complex and expensive. In this regard, for a sample set for training, it is desirable that a training set that includes a large number of samples can be transformed to a training set including only a small number of samples, and also there is a need to ensure that the training set obtained by the transformation should be able to achieve the same training effect as the original training set. For reduction of a training set, a sample set can be distilled conventionally so as to obtain a sample set including a very small number of samples, thereby replacing the original sample set with the distilled sample set for use in machine learning training.

SUMMARY OF THE INVENTION

Embodiments of the present disclosure provide a solution for generating distillation image samples using a class capsule network.

In a first aspect of the present disclosure, a method for generating image samples is provided. The method includes processing a group of image samples using a class capsule network model, and obtaining a group of distilled samples, a feature distribution of the group of distilled samples indicating a feature distribution of the group of image samples. The method also includes determining a soft label of each distilled sample in the group of distilled samples on the basis of a label of the group of image samples, the soft label representing a probability that the distilled sample belongs to each of a plurality of classes.

In a second aspect of the present disclosure, an electronic device is provided. The electronic device includes a processor and a memory coupled to the processor. The memory has instructions stored therein which, when executed by the processor, cause the device to perform actions. The actions include: processing a group of image samples using a class capsule network model, and obtaining a group of distilled samples, a feature distribution of the group of distilled samples indicating a feature distribution of the group of image samples; and determining a soft label of each distilled sample in the group of distilled samples on the basis of a label of the group of image samples, the soft label representing a probability that the distilled sample belongs to each of a plurality of classes.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the drawings:

FIG. 2 is a flow chart of an example method for generating image samples according to an embodiment of the present disclosure;

DETAILED DESCRIPTION

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, conventionally, data distillation is usually based on a convolutional neural network (CNN). However, an existing data distillation solution still has some shortcomings. For example, due to the limitations of the CNN algorithm, the reliability of labels of finally obtained distilled data is low, resulting in low explainability and robustness. Therefore, it is expected to find a more optimized data distillation solution to improve the quality of distilled data and corresponding labels.

A solution for allocating tasks to dedicated processing resources is proposed in the embodiments of the present disclosure to solve the above problem and one or more of other potential problems. In this solution, a training set is subjected to classification training using a capsule network model CapsNN. A capsule of each class is extracted from the trained CapsNN as a sample after distillation. Then, a soft label for the sample after distillation is generated on the basis of an original training set.

In this way, a distilled sample generated by means of the CapsNN has high explainability. Furthermore, based on the inheritance nature of a label, it is very easy to correspond the distilled sample to an original sample associated with it, so that the distilled sample can be applied to image retrieval, data quality measurement, and the like.

Figure 1:
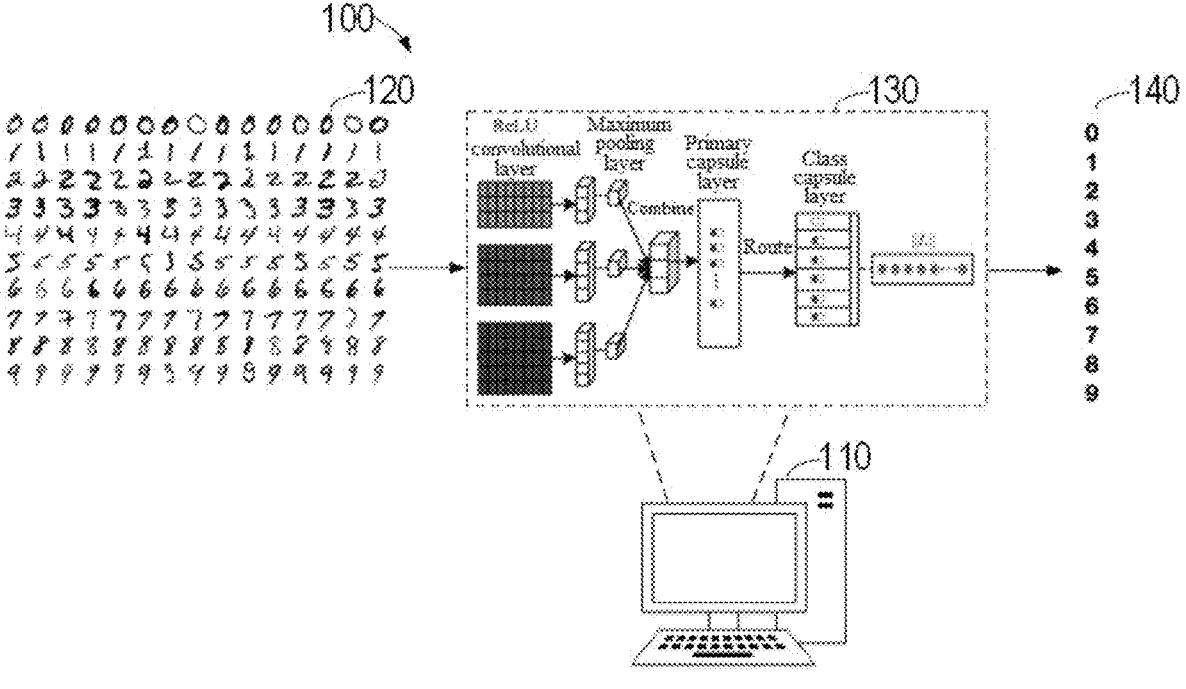
FIG. 1 is a schematic diagram of an example environment in which an embodiment of the present disclosure may be implemented.

FIG. 1 is a schematic diagram of system 100 in which an embodiment of the present disclosure can be implemented. As shown in FIG. 1, environment 100 includes computing device 110, and computing device 110 may, for example, be a device having a strong computing power, examples of which include but are not limited to: a cloud-side server, a smart phone, a notebook computer, a tablet computer, a desktop computer, an edge computing device, or the like.

As shown in FIG. 1, capsule neural network model 130 is deployed in computing device 110. A capsule in capsule neural network model 130 is composed of a group of vector neurons containing important information of all related features in a capsule network structure. The length of a vector of each vector neuron is used for expressing a probability of existence of an entity, and the direction of the vector is used for expressing an instantiation parameter of the entity. A probability sum output by the capsule is not equal to 1, that is, the capsule has the capacity of simultaneously identifying a plurality of objects and can divide highly overlapped numerals. For example, capsule neural network model 130 may be a machine learning model for classifying image samples. When receiving image sample training set 120, computing device 110 may process image sample training set 120 using capsule neural network model 130, so as to perform classification training. After the training, classification rule 140 for sample classification can be obtained.

For example, in the example shown in FIG. 1, image sample training set 120 includes image samples of handwritten numerals, namely, image samples of a plurality of handwritten Arabic numerals 0, 1, 2, 3, 4, 5, 6, 7, 8, and 9. Capsule neural network model 130 may include a plurality of layers. In the shown embodiment, capsule neural network model 130 is mainly composed of a convolutional layer, a primary capsule layer, and a class capsule layer. The primary capsule layer is the first capsule layer, and the class capsule layer is the last capsule layer. Feature extraction of image samples is completed by the convolutional layer, and then extracted features are sent to the primary capsule layer. An excitation function of the convolutional layer is the ReLU function. Features are transmitted between the capsule layers through dynamic routing. Meanwhile, capsules may also be divided into different levels. A capsule at a lower level may be referred to as a primary capsule, and a capsule at a higher level may be referred to as a high-level capsule. A low-level capsule extracts an attitude parameter from a pixel, and establishes a partial-whole hierarchical structure. Features of the primary capsule are continuously fused to the high-level capsule, and a class capsule that includes a plurality of features of one class can be finally obtained. The number of class capsules may usually be the same as the number of classes. For example, when capsule neural network model 130 is trained using image sample training set 120, if image sample training set 120 includes ten classes, ten class capsules will be generated finally in capsule neural network model 130.

It should be understood that image sample training set 120 and capsule neural network model 130 shown in FIG. 1 are only examples. The classification and number of samples therein are not understood as limiting the scope of the embodiment of the present disclosure. In addition, classification of specific samples shown in FIG. 1 is merely illustrative and is not intended to limit the present disclosure.

Example embodiments of the present disclosure will be described in detail below with reference to FIG. 2 to FIG. 4. FIG. 2 is a flow chart of example method 200 for generating image samples according to an embodiment of the present disclosure. Method 200 in FIG. 2 may be performed by, for example, computing device 110 in FIG. 1.

At 202, computing device 110 processes a group of image samples using a class capsule network model, and obtains a group of distilled samples. A feature distribution of the group of distilled samples indicates a feature distribution of the group of image samples; In this embodiment, the class capsule network model may be capsule neural network model 130 in FIG. 1. As mentioned above, the number of class capsules in the trained capsule network model is less than that of the samples. Furthermore, due to a dynamic routing mechanism in the capsule network model, the class capsules well inherit features of training samples and maintain associated information between the features. In some embodiments, a group of distilled samples may be obtained by means of extracting class capsules, i.e., capsules in the last layer of the capsule layers, from a trained capsule network model. It should be noted that the class capsules obtained by training using the image samples are a group of vectors. These vectors are visualized to obtain corresponding images, thus obtaining the distilled samples.

In some embodiments, during training of the capsule network model, a corresponding loss equation may be set for training, so that the obtained class capsules have predetermined properties.

In some embodiments, on the basis of the feature distribution of a plurality of features of the group of image samples and the feature distribution of the group of distilled samples, computing device 110 may process the group of image samples using the class capsule network model, and obtain the group of distilled samples. In this way, a training process of the class capsules is adjusted on the basis of a difference between corresponding feature distributions. For example, a feature distribution difference between the distilled samples and the image samples is made to be as small as possible; the obtained distilled samples are made to include as many features of corresponding classes in original samples as possible; and the distilled samples are made to include as much meta-information in the image samples as possible.

In some embodiments, the following items of mutual information may be set in the loss function to ensure that the distilled samples can include as much meta-information in the image samples as possible:

$$I(X, Z) = \int \int p(z|x)\hat{p}(x) \log \frac{p(z|x)}{p(z)} dxdz \tag{1}$$

where X is an original image sample set; Z is a distilled sample set; z is a distilled sample; and x is an image sample. $\hat{p}(x)$ is a feature distribution of the image sample set, and $p(z)=\int p(z|x)\hat{p}(x)dx$, $p(z|x)$ is a probability of generating distilled sample z on the basis of image sample x.

In some embodiments, on the basis of a similarity between distilled samples of the group of distilled samples, computing device 110 may process the group of image samples using the class capsule network model, so that the number of identical features included by different classes of distilled samples is less than a predetermined threshold. In such embodiments, in order to enable the class capsules, that is, the obtained distilled samples, to include relatively independent features, that is, in order that the class capsules include as few common features as possible, the following items may be set in the loss function for training:

$$L_{or} = \sum_{i,j \in Z} \langle i, j \rangle \tag{2}$$

where $\langle i,j \rangle$ is a preset similarity between the distilled samples.

In some embodiments, the following loss function may be used for training:

$$L = L_{or}(Z) - I(X, Z) \tag{3}$$

where $L_{or}(Z)$ is formula (2), and $I(X, Z)$ is formula (1).

In this way, it can be ensured that the distilled samples may include as much meta-information in the image samples as possible, and it can also be ensured that the distilled samples include as few common features as possible.

At 204, computing device 110 determines a soft label of each distilled sample in the group of distilled samples on the basis of a label of the group of image samples. The soft label represents a probability that the distilled sample belongs to each of a plurality of classes. In order to apply the extracted distilled samples to other tasks, labels need to be assigned to the distilled samples. For example, a soft label may be set for the distilled sample on the basis of the label of the image sample according to a relationship between the distilled sample and the original image sample. The process of determining a soft label will be described in detail below with reference to FIG. 3.

As such, class capsules in a trained capsule network model are extracted as distilled samples, and soft labels are assigned to the distilled samples on the basis of original image samples, so that the extracted distilled samples can be ensured to have high explainability. Furthermore, based on the inheritance nature of a label, it is very easy to correspond the distilled samples to the original samples associated with them; and therefore, the distilled samples can be applied to image retrieval, data quality measurement, and the like.

The process of determining a label is described in detail below with reference to FIG. 3.

Figure 3:
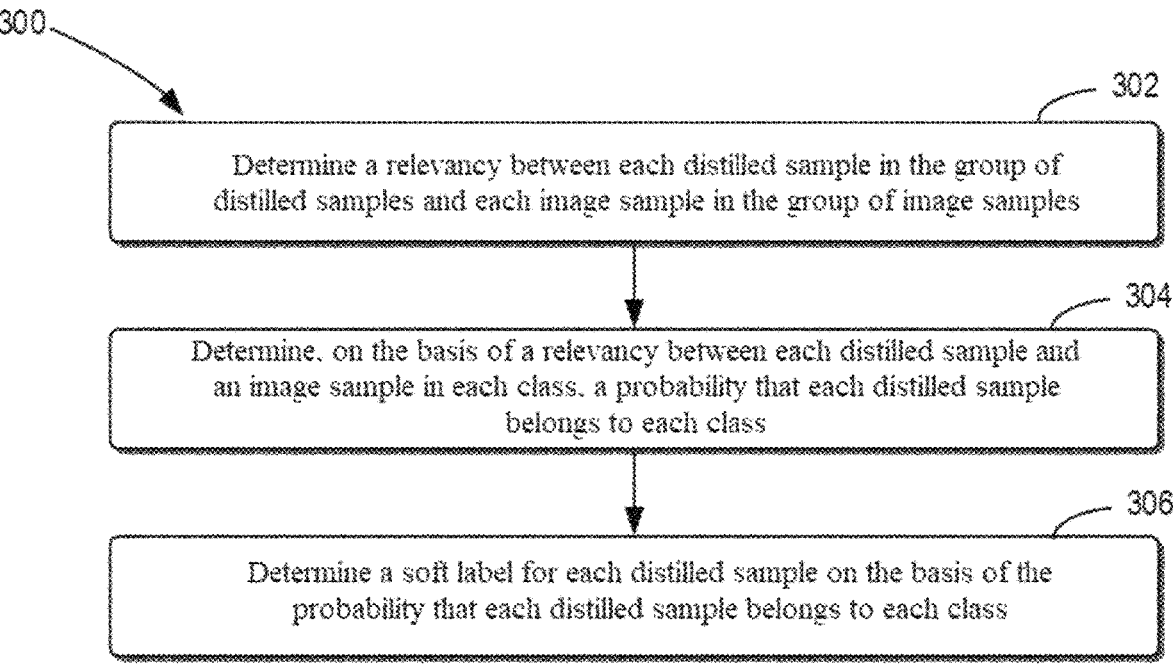
FIG. 3 is a flow chart of an example method for determining a soft label according to an embodiment of the present disclosure.

FIG. 3 is a flow chart of example method 300 for determining a soft label according to an embodiment of the present disclosure. Method 300 in FIG. 3 may be performed by, for example, computing device 110 in FIG. 1.

At 302, computing device 110 determines a relevancy between each distilled sample in the group of distilled samples and each image sample in the group of image samples. The relevancy may, for example, indicate the number or ratio of identical features included in the distilled sample and the image sample. The relevancy may, for example, also indicate a similarity between the distilled sample and the image sample represented by features in a feature space.

In some embodiments, computing device 110 may obtain a distilled feature of each distilled sample while processing the group of image samples using the class capsule network model. The distilled feature may, for example, be a feature vector of the distilled sample in a particular feature space. Computing device 110 processes the group of image samples using a classification model, so as to acquire an original feature of each image sample in the group of image samples. Finally, computing device 110 determines the relevancy on the basis of the distilled feature and the original feature. As such, the relevancy between the distilled sample and the image sample can be quantitatively determined using the feature vector.

At 304, a probability that each distilled sample belongs to each class is determined on the basis of the relevancy between each distilled sample and an image sample in the each class.

In some embodiments, computing device 110 may determine a weighted sum of similarities between each distilled sample and image samples in each class, thus taking the weighted sum as the probability that each distilled sample belongs to the each class. In some embodiments, normalization may also be performed after the probability is obtained.

At 306, computing device 110 may determine the soft label for each distilled sample on the basis of the probability that each distilled sample belongs to each class.

As such, by means of calculating the relevancy between each distilled sample and all image samples in each class, the relevancy can be used to express the probability that the distilled sample belongs to the corresponding class, thus obtaining the soft label. The process of generating image samples will be described in detail below with reference to FIG. 4.

Figure 4:
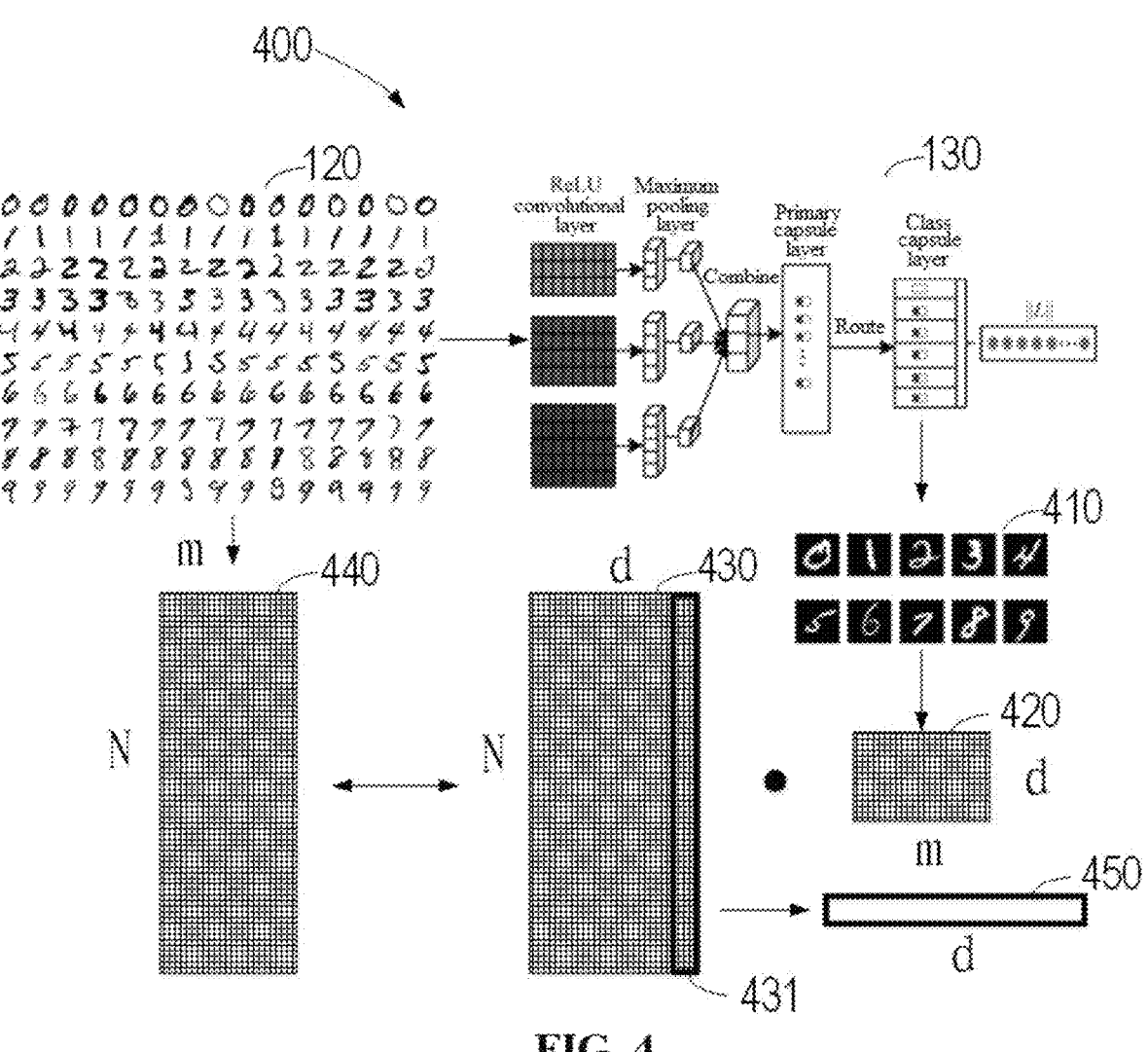
FIG. 4 is a schematic diagram of an example process of generating image samples according to some embodiments of the present disclosure.

FIG. 4 is a schematic diagram of example process 400 of generating image samples according to some embodiments of the present disclosure. Process 400 in FIG. 4 may be performed by, for example, computing device 110 in FIG. 1. As shown in FIG. 4, image sample training set 120 shown in FIG. 1 is used to perform classification training on capsule neural network model 130. In the embodiment shown in FIG. 4, image sample training set 120 includes N image samples. After the training is completed, class capsules in trained capsule neural network model 130 are extracted as distilled sample set 410, and distilled feature matrix 420 of distilled sample set 410 is obtained at the same time. The number of the distilled samples in distilled sample set 410 is d, and each distilled feature is an m-dimensional feature vector, so that distilled feature matrix 420 is d×m-dimensional. It should be understood that the embodiment shown in FIG. 4 includes ten distilled samples corresponding to ten classes, i.e., d=10, but for the sake of generality, the following also continues to use m to generally represent the number of distilled features. Distilled feature matrix 420 is then multiplied with N×d relevancy matrix 430 to obtain image sample feature matrix 440 of image sample training set 120, and image sample feature matrix 440 is N×m. Each element in relevancy matrix 430 corresponds to a relevancy between a distilled sample and an image sample.

In order to calculate relevancy matrix 430, relevancy matrix 430 is initialized. For example, relevancy matrix 430 is made to be a N×d unit matrix. Initialized image sample feature matrix 440 may then be obtained. The classification model is then used to train image sample training set 120, and N×m-dimensional image sample feature matrix 440 is obtained; and then relevancy matrix 430 is obtained according to image sample feature matrix 440 and distilled feature matrix 420. A column in relevancy matrix 430 is relevancy vector 431. Relevancy vector 431 indicators a relevancy between one distilled sample and each image sample. Then, a weighted sum of relevancy vectors 431 is calculated on the basis of the classes, thus obtaining d-dimensional soft label 450.

In some alternative embodiments, another classification model can be used to train image sample training set 120, and m-dimensional image sample feature vectors are obtained, thus obtaining image sample feature matrix 440 (represented by the dotted arrow); and relevancy matrix 430 is obtained according to image sample feature matrix 440 and distilled feature matrix 420.

Figure 5:
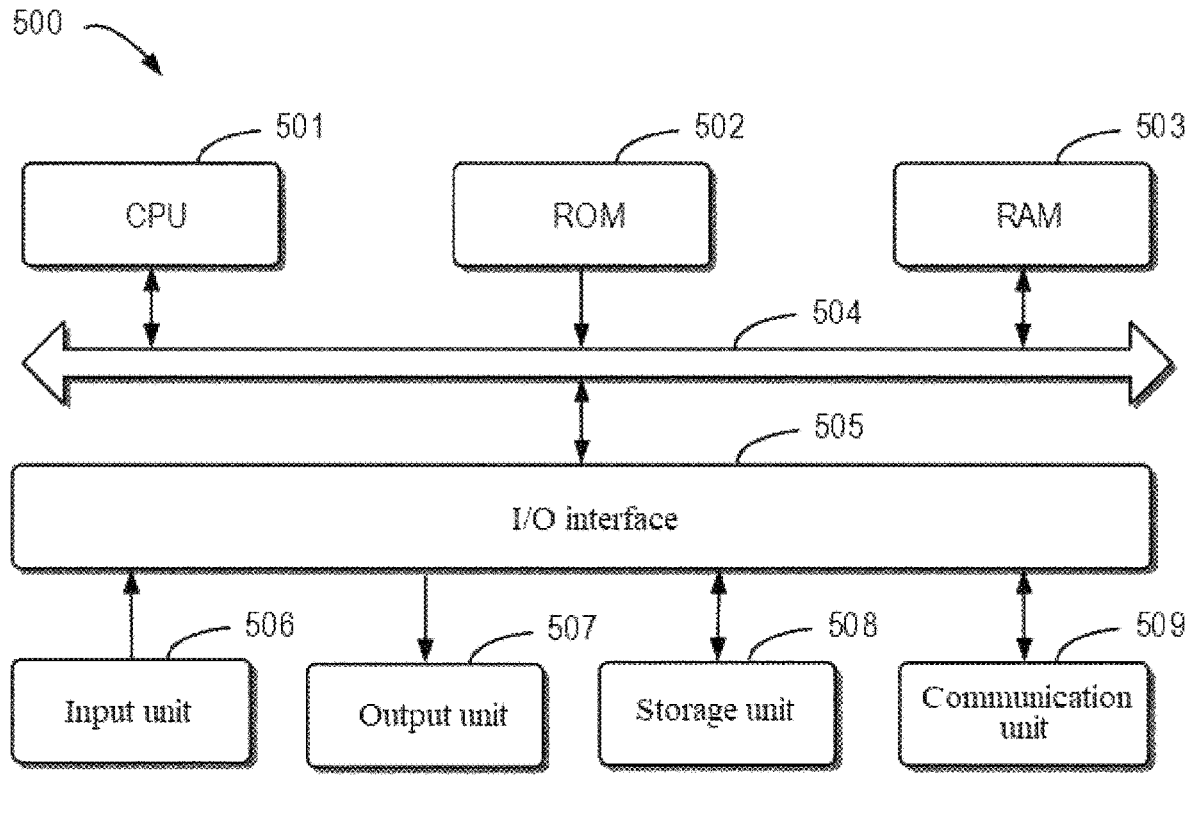
FIG. 5 is a block diagram of an example device that can be used to implement an embodiment of the present disclosure.

FIG. 5 is a schematic block diagram of example device 500 that can be used to implement an embodiment of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processing unit 501 may perform the various processes and processing described above, such as method 200, method 300, and process 400. For example, in some embodiments, method 200, method 300, and process 400 may be implemented as a computer software program that is tangibly included in a machine-readable medium, such as storage unit 508. In some embodiments, part of or all the computer program may be loaded and/or installed to device 500 via ROM 502 and/or communication unit 509. One or more actions of method 200, method 300, and process 400 described above may be performed when the computer program is loaded into RAM 503 and executed by CPU 501.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method for generating image samples, comprising:
processing a group of image samples using a class capsule network model, trained with a loss function comprising $L=Lor(Z)-I(X,Z)$, where Lor ensures minimal common features between different classes of distilled samples and $I(X,Z)$ ensures meta-information preservation, and obtaining a group of distilled samples by extracting class capsules from the class capsule network model and visualizing the class capsules as images, a feature distribution of the group of distilled samples indicating a feature distribution of the group of image samples; and determining a soft label of each distilled sample in the group of distilled samples on the basis of a label of the group of image samples, the soft label representing a probability that the distilled sample belongs to each of a plurality of classes.

2. The method according to claim 1, wherein obtaining a group of distilled samples comprises:
on the basis of the feature distribution of a plurality of features of the group of image samples and the feature distribution of the group of distilled samples, processing the group of image samples using the class capsule network model trained with the loss function $L=Lor$ $(Z)-I(X,Z)$ where $I(X,Z)=\iint p(z|x)p(x)\log[p(z|x)/p(z)]$ dxdz, and obtaining the group of distilled samples by extracting and visualizing class capsules.

3. The method according to claim 1, wherein obtaining a group of distilled samples comprises:
on the basis of a similarity between distilled samples of the group of distilled samples, processing the group of image samples using the class capsule network model trained with a loss function comprising $Lor=-\Sigma\phi(i,j)$ for $i,j\in Z$, so that the number of identical features comprised by different classes of distilled samples is less than a predetermined threshold, and extracting and visualizing class capsules to obtain the distilled samples.

4. The method according to claim 1, wherein determining a soft label of each distilled sample in the group of distilled samples comprises:
determining a relevancy between each distilled sample in the group of distilled samples and each image sample in the group of image samples using an N×d relevancy matrix, where N is the number of image samples and d is the number of distilled samples;
determining, on the basis of a relevancy between each distilled sample and an image sample in each class, a probability that each distilled sample belongs to the each class; and
determining the soft label for each distilled sample on the basis of the probability that each distilled sample belongs to the each class.

5. The method according to claim 4, wherein determining the relevancy comprises:
acquiring a distilled feature of each distilled sample in the group of distilled samples, wherein the distilled feature is obtained when the group of image samples is processed using the class capsule network model and the class capsules are extracted;
processing the group of image samples using a classification model separate from the class capsule network model, and acquiring an original feature of each image sample in the group of image samples; and
determining the relevancy on the basis of the distilled feature and the original feature by calculating the N×d relevancy matrix.

6. The method according to claim 4, wherein determining a probability that each distilled sample belongs to the each class comprises:
determining a weighted sum of similarities between each distilled sample and image samples in each class as the probability that each distilled sample belongs to the each class using the N×d relevancy matrix.

7. The method according to claim 1, further comprising:
training a machine learning model using the distilled samples obtained by extracting and visualizing class capsules and the soft labels.

8. An electronic device, comprising:

at least one processing unit; and at least one memory, the at least one memory being coupled to the at least one processing unit and storing instructions executed by the at least one processing unit, the instructions, when executed by the at least one processing unit, causing the device to perform acts comprising:

processing a group of image samples using a class capsule network model, trained with a loss function comprising $L=Lor(Z)-I(X,Z)$, where Lor ensures minimal common features between different classes of distilled samples and $I(X,Z)$ ensures meta-information preservation, and obtaining a group of distilled samples by extracting class capsules from the class capsule network model and visualizing the class capsules as images, a feature distribution of the group of distilled samples indicating a feature distribution of the group of image samples; and determining a soft label of each distilled sample in the group of distilled samples on the basis of a label of the group of image samples, the soft label representing a probability that the distilled sample belongs to each of a plurality of classes.

9. The electronic device according to claim 8, wherein obtaining a group of distilled samples comprises:

on the basis of the feature distribution of a plurality of features of the group of image samples and the feature distribution of the group of distilled samples, processing the group of image samples using the class capsule network model trained with the loss function $L=Lor(Z)-I(X,Z)$ where $I(X,Z)=\iint p(z|x)p(x)\log[p(z|x)/p(z)]dxdz$, and obtaining the group of distilled samples by extracting and visualizing class capsules.

10. The electronic device according to claim 8, wherein obtaining a group of distilled samples comprises:

on the basis of a similarity between distilled samples of the group of distilled samples, processing the group of image samples using the class capsule network model trained with a loss function comprising $Lor=-\Sigma\phi(i,j)$ for $i,j\in Z$, so that the number of identical features comprised by different classes of distilled samples is less than a predetermined threshold, and extracting and visualizing class capsules to obtain the distilled samples.

11. The electronic device according to claim 8, wherein determining a soft label of each distilled sample in the group of distilled samples comprises:

determining a relevancy between each distilled sample in the group of distilled samples and each image sample in the group of image samples using an N×d relevancy matrix, where N is the number of image samples and d is the number of distilled samples;

determining, on the basis of a relevancy between each distilled sample and an image sample in each class, a probability that each distilled sample belongs to the each class; and determining the soft label for each distilled sample on the basis of the probability that each distilled sample belongs to the each class.

12. The electronic device according to claim 11, wherein determining the relevancy comprises:

acquiring a distilled feature of each distilled sample in the group of distilled samples, wherein the distilled feature is obtained when the group of image samples is processed using the class capsule network model and the class capsules are extracted;

processing the group of image samples using a classification model separate from the class capsule network model, and acquiring an original feature of each image sample in the group of image samples; and determining the relevancy on the basis of the distilled feature and the original feature by calculating the N×d relevancy matrix.

13. The electronic device according to claim 11, wherein determining a probability that each distilled sample belongs to the each class comprises:

determining a weighted sum of similarities between each distilled sample and image samples in each class as the probability that each distilled sample belongs to the each class using the N×d relevancy matrix.

14. The electronic device according to claim 8, wherein the acts further comprise:

training a machine learning model using the distilled samples obtained by extracting and visualizing class capsules and the soft labels.

15. A computer program product, tangibly stored on a non-transitory computer-readable medium and comprising machine-executable instructions, the machine-executable instructions, when executed, causing a machine to perform acts comprising:

processing a group of image samples using a class capsule network model, trained with a loss function comprising $L=Lor(Z)-I(X,Z)$, where Lor ensures minimal common features between different classes of distilled samples and $I(X,Z)$ ensures meta-information preservation, and obtaining a group of distilled samples by extracting class capsules from the class capsule network model and visualizing the class capsules as images, a feature distribution of the group of distilled samples indicating a feature distribution of the group of image samples; and determining a soft label of each distilled sample in the group of distilled samples on the basis of a label of the group of image samples, the soft label representing a probability that the distilled sample belongs to each of a plurality of classes.

16. The computer program product according to claim 15, wherein obtaining a group of distilled samples comprises:

on the basis of the feature distribution of a plurality of features of the group of image samples and the feature distribution of the group of distilled samples, processing the group of image samples using the class capsule network model trained with the loss function $L=Lor(Z)-I(X,Z)$ where $I(X,Z)=\iint p(z|x)p(x)\log[p(z|x)/p(z)]dxdz$, and obtaining the group of distilled samples by extracting and visualizing class capsules.

17. The computer program product according to claim 15, wherein obtaining a group of distilled samples comprises:

on the basis of a similarity between distilled samples of the group of distilled samples, processing the group of image samples using the class capsule network model trained with a loss function comprising $Lor=-\Sigma\phi(i,j)$ for $i,j\in Z$, so that the number of identical features comprised by different classes of distilled samples is less than a predetermined threshold, and extracting and visualizing class capsules to obtain the distilled samples.

18. The computer program product according to claim 15, wherein determining a soft label of each distilled sample in the group of distilled samples comprises:

determining a relevancy between each distilled sample in the group of distilled samples and each image sample in the group of image samples using an N×d relevancy matrix, where N is the number of image samples and d is the number of distilled samples;

determining, on the basis of a relevancy between each distilled sample and an image sample in each class, a probability that each distilled sample belongs to the each class; and determining the soft label for each distilled sample on the basis of the probability that each distilled sample belongs to the each class.

19. The computer program product according to claim 18, wherein determining the relevancy comprises:

acquiring a distilled feature of each distilled sample in the group of distilled samples, wherein the distilled feature is obtained when the group of image samples is processed using the class capsule network model and the class capsules are extracted;

processing the group of image samples using a classification model separate from the class capsule network model, and acquiring an original feature of each image sample in the group of image samples; and determining the relevancy on the basis of the distilled feature and the original feature by calculating the N×d relevancy matrix.

20. The computer program product according to claim 18, wherein determining a probability that each distilled sample belongs to the each class comprises:

determining a weighted sum of similarities between each distilled sample and image samples in each class as the probability that each distilled sample belongs to the each class using the N×d relevancy matrix.

*   *   *   *   *